(12) United States Patent
Niehoff et al.

(10) Patent No.: US 8,127,574 B2
(45) Date of Patent: Mar. 6, 2012

(54) METHOD FOR PRODUCING MINERAL WOOL

(75) Inventors: Thomas Niehoff, Markt Indersdorf (DE); Herbert Plaschke, Oberhausen (DE); Dirk Rogge, Amorbach (DE); Bernd Rudolph, Bad Hersfeld (DE)

(73) Assignee: Linde Aktiengesellschaft (DE)

( * ) Notice: Subject to any disclaimer, the term of this patent is extended or adjusted under 35 U.S.C. 154(b) by 169 days.

(21) Appl. No.: 12/484,262

(22) Filed: Jun. 15, 2009

(65) Prior Publication Data

US 2009/0314035 A1 Dec. 24, 2009

(30) Foreign Application Priority Data

Jun. 24, 2008 (EP) .................................... 08011419

(51) Int. Cl.
  *C03B 37/01* (2006.01)
(52) U.S. Cl. ........... 65/474; 65/482; 65/134.4; 65/136.1
(58) Field of Classification Search .................... 65/474, 65/482, 134.4, 136.1
  See application file for complete search history.

(56) References Cited

U.S. PATENT DOCUMENTS

| | | | |
|---|---|---|---|
| 3,547,624 A | 12/1970 | Gray | |
| 3,958,919 A * | 5/1976 | Kjell-Berger | 432/14 |
| 4,291,634 A * | 9/1981 | Bergsten et al. | 110/235 |
| 4,797,142 A * | 1/1989 | Jensen | 65/436 |
| 5,045,506 A | 9/1991 | Dube et al. | |
| 5,107,517 A | 4/1992 | Lauren | |
| 5,116,399 A * | 5/1992 | Lauwers | 65/135.1 |
| 5,217,363 A | 6/1993 | Brais et al. | |
| 5,266,025 A * | 11/1993 | Francis et al. | 431/187 |
| 5,417,731 A * | 5/1995 | LeBlanc et al. | 65/134.4 |
| 5,605,104 A | 2/1997 | Gross et al. | |
| 5,628,809 A * | 5/1997 | Kobayashi | 65/134.4 |
| 5,807,418 A * | 9/1998 | Chamberland et al. | 65/134.4 |
| 5,853,448 A * | 12/1998 | Duchateau et al. | 65/134.4 |
| 2002/0005089 A1* | 1/2002 | Nagata et al. | 75/433 |

FOREIGN PATENT DOCUMENTS

DE 195 32 657 A1 2/1996

* cited by examiner

*Primary Examiner* — John Hoffmann
(74) *Attorney, Agent, or Firm* — Joshua L. Cohen

(57) ABSTRACT

The invention relates to a method for producing mineral wool, wherein a mineral base material is melted in a cupola furnace having a shaft to hold the base material, the lower section of said shaft being provided with a grate, and beneath said grate there is a combustion chamber. The combustion chamber is heated by one or a plurality of burners, the burner or burners being run on liquid or gaseous fuel and an oxygen-containing gas. The burners are operated such that the length of the flames occurring during combustion of the fuel with the oxygen-containing gas is between 60% and 100% of the combustion chamber diameter.

13 Claims, 2 Drawing Sheets

METHOD FOR PRODUCING MINERAL WOOL

Figure 1:
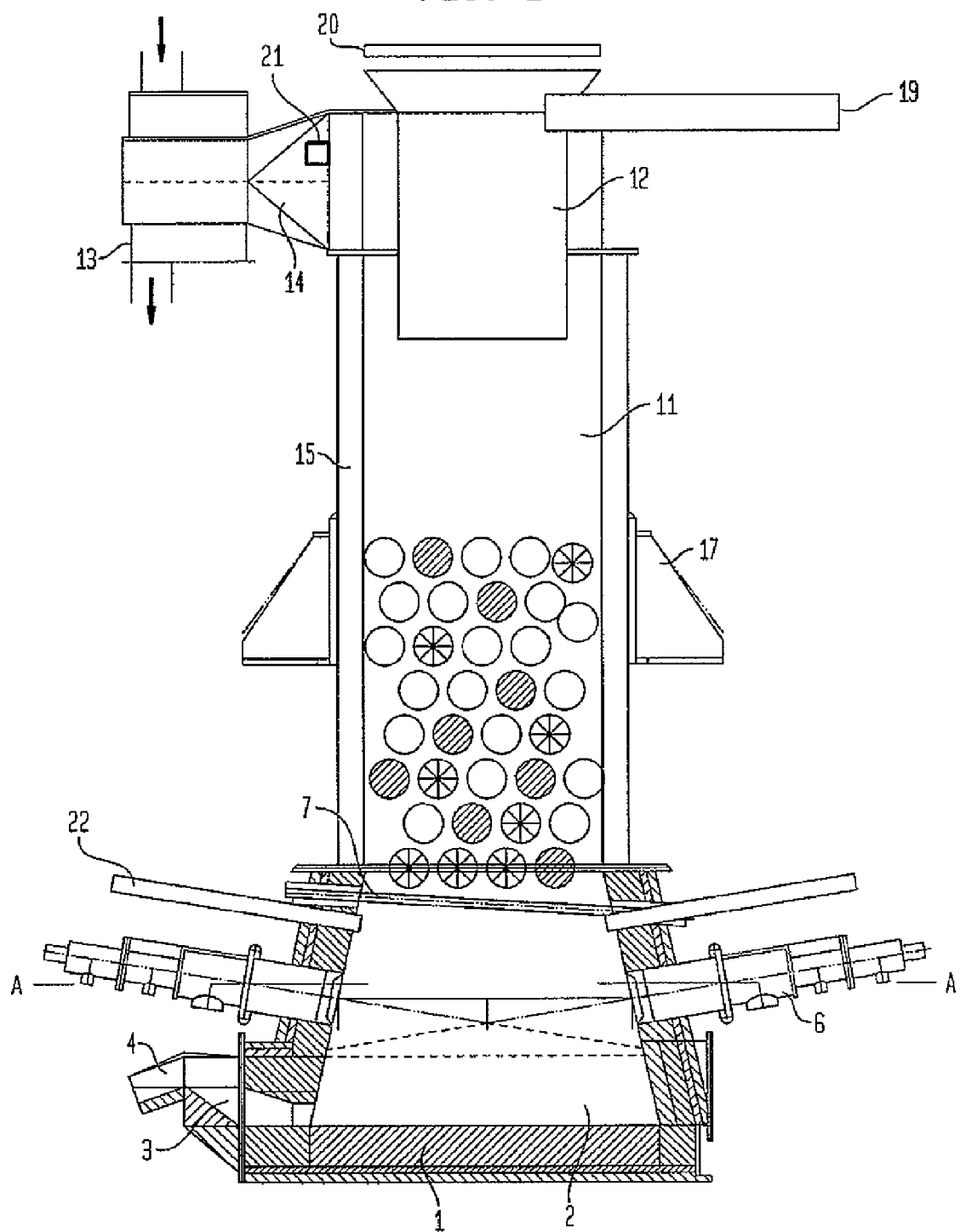

The invention relates to a method for producing mineral wool, wherein a mineral base material is melted in a cupola furnace.

Mineral wool is produced from a siliceous base material, which is first melted and then defibrated. Natural stone, such as basalt, diabase, limestone or dolomite for example, artificial stone, such as moulded bricks made to a specific formulation, for example, glass, metal slag or other mineral materials are used as the base material.

The terms mineral wool and mineral fibres are used synonymously in the following and are intended to encompass all types of fibres produced from the aforementioned base material.

The base material is melted down in a melting furnace. This usually involves the use of a shaft furnace, particularly a cupola furnace. The resulting mineral melt is then fed to a defibration plant, which breaks the melt down into fine mineral fibres. The mineral fibres are mainly mixed with binding agents and additives, further processed if necessary, so that they are finally worked into acoustic tiles, insulating boards or tracks or moulds. The insulating materials thereby produced from mineral wool are used in a known way for sound or heat insulation or as fire-safety materials.

The mineral base material has hitherto mainly been melted in coke-fired cupola furnaces. The cupola furnace is charged from above with fuel in the form of coke, the mineral base material and additive substances. Combustion air is blown into the lower part of the furnace. The resulting mineral melt accumulates on the floor of the cupola furnace and can be siphoned off.

However, traditional, coke-fired cupola furnaces of this type generate high carbon monoxide, carbon dioxide and dust emissions. Cokeless cupola furnaces are therefore already known, particularly for melting metals. Liquid or gaseous energy sources, such as heating oil or natural gas, for example, are used as the fuel in "cokeless" cupola furnaces.

The cokeless cupola furnaces known from iron production cannot simply be used for mineral wool production, as completely different energy, heat and chemical conditions exist in the furnace.

A cupola furnace is described in DE 38 75 616 T2, which is specially designed for mineral wool production. The base material to be melted down is disposed with ceramic filling materials on a water-cooled grate. Beneath the grate is the combustion chamber, which is heated by means of a main burner fired with gaseous or liquid fuels. In addition, natural gas-powered auxiliary burners are disposed above the grate, in order to guarantee regular melt-off.

The object of the present invention is to identify an improved method of producing mineral wool. In particular, the operating method of a cokeless cupola furnace should be optimised in relation to the special requirements involved in the melting of mineral base materials for mineral wool production.

This object is solved by a method for producing mineral wool, wherein a mineral base material is melted in a cupola furnace, wherein the cupola furnace has a shaft to hold the base material, the lower section of said shaft being provided with a grate, and wherein beneath said grate there is a combustion chamber provided with an outlet for removal of the molten base material, wherein the combustion chamber is heated by one or several burners, the burner or burners being supplied with a liquid or gaseous fuel and the fuel being converted with an oxygen-containing gas and which is characterised in that the quantity and oxygen content of the oxygen-containing gas is regulated according to at least one parameter characterising the melting process, particularly the flue gas temperature, flue gas composition, temperature of the base material being melted and/or that has been melted or the flame intensity.

According to the invention, the melting process in the cupola furnace is regulated by the oxygen concentration of the oxygen-containing gas and by the quantity of said gas. By increasing the oxygen concentration, the flame intensity and temperature can be increased significantly. The transfer of heat to the base material being melted is intensified and the melting capacity increased. By omitting or reducing the nitrogen not required during combustion, both the quantity of flue gas and also the fuel consumption are reduced. Due to the higher flame temperature, the heat transfer by radiation acquires a greater significance.

If, conversely, the oxygen concentration in the oxygen-containing gas is reduced, while the total quantity of oxygen remains the same, this means that the quantity of gas not actively participating in combustion, usually nitrogen, increases. In this case, correspondingly greater quantities of gas are moved by the cupola furnace. The transfer of heat to the base material being melted will therefore essentially take place by convection. The gas heated by the burners, particularly nitrogen, flows through the cupola furnace, thereby releasing heat to the base material.

Finally, by increasing the total amount of oxygen and adjusting the fuel quantity accordingly, the burner output and therefore the total heat introduced into the cupola furnace per unit of time is increased.

According to the invention, not only can the heat output supplied to the furnace be affected by this, but also the predominant type of heat transfer too—namely, convection or heat radiation. This means that with appropriate regulation, while the heat transfer mechanism remains the same, the heat output supplied can be changed or, while the heat supply remains the same, the nature of the main heat transmission can be influenced. Both parameters—the heat output, supplied and the heat transfer mechanism—can be adjusted independently of one another. The melting process can therefore be controlled with significantly greater accuracy. According to the invention, the heat transfer mechanism and total heat output supplied are set according to one or more parameters characterising the melting process, particularly the flue gas temperature, flue gas composition, temperature of the base material being melted and/or that has been melted or the flame intensity.

An oxygen-containing gas is advantageously supplied to the cupola furnace during the heating phase, when none of the molten base material can be removed through the outlet, which has a smaller proportion of oxygen than the oxygen-containing gas supplied to the cupola furnace in the melting phase, when the molten base material can be removed through the outlet.

When the cupola furnace is started or heated up, once the furnace has been charged with base material, the most uniform heating possible of the entire base material is desirable. It is therefore advantageous for the proportion of oxygen in the oxygen-containing gas to be reduced, which, conversely, causes the proportion of non-oxygen gases to rise. For example, air is supplied to the cupola furnace during this heating phase, which is enriched to an oxygen proportion of 25%, i.e. roughly 75% of the oxygen-containing gas supplied is nitrogen, which is not involved in the fuel combustion. The nitrogen or non-oxygen parts of the oxygen-containing gas in general must be removed by the cupola furnace through the flue gas line. This involves these gases flowing through the base material and heating it by convection.

This heating phase involving convection as the predominant heat transfer mechanism is preferably continued until the operating temperature has essentially been set in the cupola furnace. This is characterised by the fact that liquid material flows from the outlet or tap hole in the cupola furnace.

It is particularly favourable in this phase for the burner or burners to be operated in such a way that flameless combustion is used.

As soon as the operating temperature prevails in the cupola furnace and the melted base material can be drawn off as a liquid, it is advantageous to switch to an operating method in which heat radiation is the main part or at least a greater part of the heat transmission to the base material being melted. To achieve this, the proportion of oxygen in the oxygen-containing gas supplied to the cupola furnace is increased, causing the flame intensity to be significantly greater and the heat radiation intensified. The flame intensity may be monitored by means of a UV probe, for example.

The oxygen-containing gas supplied to the cupola furnace for fuel combustion may be supplied to the burner itself and/or to another point in the cupola furnace. An oxygen-containing gas is preferably supplied to the burner or burners during the heating phase, which has a smaller proportion of oxygen than the oxygen-containing gas supplied to the burner or burners during the melting phase.

It has proved beneficial to operate the burner or burners during the heating phase with an oxygen-containing gas, which has an oxygen proportion of under 30%, preferably between 21% and 30%, and for the burner or burners to be operated in the melting phase with an oxygen-containing gasp which has an oxygen proportion of over 30%. The oxygen-containing gas is either supplied direct to the burner(s) or introduced elsewhere in the cupola furnace and a reaction is initiated with the fuel. The fuel is therefore combusted during the heating phase with an oxygen-containing gas with an oxygen content of under 30% and in the melting phase with an oxygen-containing gas, which has an oxygen share of over 30%. All gas proportions in this description are given in percentages by volume.

It has proved beneficial to operate the burners in such a way that the length of the flames occurring during combustion of the fuel with the oxygen-containing gas is between 60% and 100%, preferably between 65% and 95%, of the combustion chamber diameter.

If the flames do not run along a combustion chamber diameter, it has proved beneficial for the length of the flame to be set in such a way that it is between 65% and 95% of the free distance of the flame in the combustion chamber, in other words, 65% to 95% of the gap between the burner outlet and the opposite wall of the combustion chamber in the flame direction.

It has been shown that the length of the flames in the combustion chamber has a crucial effect on the melting process and the heat transfer to the melted material. Both a small and a large flame length lead to uneven heating of the combustion chamber and the base material being melted and, consequently, to a frequently inadequate and in some cases non-reproducible melted product quality.

Hence, for instance, if the flame length is too short, the furnace brickwork is exposed to excessive thermal loads and may be damaged. The same applies if the flames are too long and make direct contact with the opposite wall of the combustion chamber. According to the invention, the flame lengths are therefore set in such a way that an even thermal load is achieved throughout the entire combustion chamber.

The method according to the invention is used particularly advantageously in cupola furnaces in which the proportion of coke in the fuel is less than 20% by weight. The invention is particularly preferably used in cokeless cupola furnaces, i.e. in cupola furnaces in which coke is not used as the fuel. Heat is preferably supplied to the cupola furnace exclusively by means of the burners, i.e. by combusting the fuel with the oxygen-containing gas. When the cupola furnace is operated according to the invention, an oxidising atmosphere prevails in the furnace, in contrast with the reductive performance of a coke-fired cupola furnace. The generation of hydrogen and environmentally harmful flue gases is thereby avoided and the exhaust gas can be released into the atmosphere without expensive secondary treatment.

The base material composition is chosen in such a way that the mineral wool produced has a specific perceived colour; in other words, black, yellow or white mineral wool, for example, is produced. This requires the iron content or the iron oxide content of the base material, for example, to be selected accordingly or chemical admixtures and additives are systematically added.

The burners are advantageously supplied with oxygen-enriched air as the oxygen-containing gas. It has proved beneficial for the oxygen content of the oxygen-containing gas to be set at a value of between 21% and 50%. It is particularly preferable for the combustion air supplied to the burners to be enriched to an oxygen content of between 25% and 40%. However, it is also possible for the burners to be operated as pure oxygen burners, in other words, to supply the burners with technically pure oxygen as the oxidation agent.

According to the invention, a liquid or, preferably, gaseous fuel is used, wherein natural gas is especially advantageously employed. However, other combustion gases, such as propane, butane, etc., for example, or liquid fuels such as oil or heating oil, for example, may be suitable in principle.

Apart from the flame length, the configuration and alignment of the flames produced by the burners also has an effect on the melting process.

The combustion chamber is preferably heated by 2 to 8 burners, particularly preferably by 3 to 5 burners. The burners are directed into the combustion chamber from the side. This requires the side walls of the combustion chamber to be equipped with means of holding the burners or else with openings to pass the burners through.

The outlet of a burner or the burner tip is preferably level with the corresponding side wall, which holds the burner or through which the burner passes.

In order to protect the burner tip, it may also be advantageous for the burner to be recessed in the side wall. In this case, the burner's outlet is not level with the inside of the side wall, but displaced outwardly.

In order to ensure the most even heating possible, the burners are preferably evenly distributed over the periphery of the combustion chamber. So, for example, when using three burners, these are disposed at the tips of an imaginary equilateral triangle. Based on the centre of the combustion chamber, the angular distance between the burner openings in this case is 120°. In the same way, four burners are located at the corners of an imaginary square. If the combustion chamber is square, for example, an embodiment with four burners is preferably used.

The combustion chamber is advantageously circular in cross-section, so that no spatial direction is preferred. The method according to the invention may, however, also be implemented in a cupola furnace with a combustion chamber that is square in cross-section, as mentioned above, such as when an existing furnace is to be adapted to the method according to the invention.

The combustion chamber is preferably cylindrical or extends conically from top to bottom. In the latter case, the cross-sectional surface of the combustion chamber advantageously grows constantly and uniformly from top to bottom. Preferred embodiments of the combustion chamber to this extent are a truncated cone or a truncated pyramid. The combustion chamber may, however, also be extended from top to bottom in one or several stages or steps.

According to the invention, the burner flames used to heat the base material are adapted to the combustion chamber by selecting their length to suit the size and shape of said combustion chamber. It has been demonstrated that the alignment of the flames and their uniform operation has a significant effect on the melting process. The centre axes of the burners are therefore inclined at an angle of between 5° and 15°, particularly preferably between 8° and 12°, relative to the horizontal.

In this case, the centre axes of the burners are preferably tilted downwards and the flames emerging from the burners are directed downwards at a corresponding angle, so that the outward flowing melted material is overheated quickly and effectively. The correct temperature and therefore viscosity of the melt has a crucial effect on the melt result.

In a further preferred embodiment, the burners are each disposed in such a way that the projection of the central axis of the burner and the projection of the combustion chamber diameter running through the burner outlet produce an angle of between 3° and 20°, preferably between 5° and 15°, on a horizontal plane. Productions of the central axes of the burners do not therefore intersect the mid-perpendicular of the combustion chamber. The flames are not directed precisely towards the centre of the combustion chamber, but are slightly outwardly displaced, depending on the angle set, wherein all burners are preferably disposed at the same angle or displaced, depending on the number of burners. Depending on the flow speed of the fuel and the oxygen-containing gas from the burner, a rotational movement of the hot combustion gases is thereby caused in the combustion chamber, which results in a further evening out of the power supply.

An external-mixing-type burner is advantageously used, i.e. a burner in which the combustion gas and the oxygen-containing gas are supplied separately to the burner head and are only mixed together once they are outside the burner. Particularly advantageous is a burner with at least one combustion gas supply line, at least one supply line for a first oxygen-containing gas and at least one supply line for a second oxygen-containing gas. In this case, the burner head has separate outlets for the combustion gas and the two oxygen-containing gases. Air is preferably used as one of the oxygen-containing gases and oxygen-enriched air or pure oxygen as the other oxygen-containing gas.

In a further preferred embodiment, the burner or burners are provided with an independent compressed air cooling system in the event of a system failure. If there is a power cut, both the fan conveying air to the burner and the oxygen-natural gas control path, which controls the supply of oxygen and natural gas to the burner, fail. In other words, in the event of a power cut, the burner is not normally supplied with either air or oxygen or with combustion gas/natural gas. The cupola furnace itself is still hot, however, which means that the burners will be damaged in a very short period of time if there is not some other means of cooling them.

An independent compressed air cooling system is advantageously used for this. A branch connection is provided in the supply line leading to the burner for the first and/or the supply line for the second oxygen-containing gas, which is connected to a compressed air reservoir. There is a solenoid valve in the line connecting the compressed air reservoir to the branch connection, which is closed in the live state and open in the dead state. The solenoid valve is therefore closed during normal operation and the compressed air reservoir disconnected from the burners. In the event of a power cut, the solenoid valve opens automatically and the compressed air can flow out of the compressed air reservoir to the burners and cool these. This gives the furnace operator more time to correct the system failure or put another cooling system into operation.

Burners such as those described in DE 100 46 569 A1 are particularly preferred. With this type of burner, the outlets in the burner head are disposed such that the gases emerge from the burner in an essentially axial direction, while the outlets of all combustion gas supply lines are located in the flow direction towards the outlets of the first and second supply lines.

A temperature of between 1200 and 1800° C. is preferably produced with the burners in the combustion chamber. Particularly preferably, the temperature in the combustion chamber is set at between 1350 and 1650° C. The precise temperature range in this case is dependent on the nature and composition of the base material supplied to the furnace for melting.

The specific burner output is advantageously between 1000 and 1500 kW per tonne of melting material. Furthermore, the burner output is preferably selected at 1100 to 1200 kWh.

In one embodiment of the invention, the proportion of oxygen in the oxygen-containing gas supplied to the burners at furnace temperatures below 800° C., in other words, during the heating phase, is between 21% and 30%, preferably between 25% and 28%. The start-up should be slow, so as to avoid large temperature gradients in the furnace, which could damage the cupola furnace.

It is therefore particularly advantageous for the cupola furnace not to be heated with all burners in this heating phase, but preferably with only one burner.

After the furnace has been heated up for the first time at temperatures of over 800° C., the power supplied to the furnace via the burners may be increased. It is then advantageous for all burners installed in the furnace to be used. The proportion of oxygen in the oxygen-containing gas, which is supplied to the burners, is increased compared with the heating phase, preferably to values of between 32% and 37%, particularly 35%. This high proportion of oxygen is preferably retained until the temperature in the cupola furnace has reached 1350° C.

At temperatures of over 1350° C., the power supplied to the furnace via the burners may be reduced again. It has proved beneficial for the proportion of oxygen in the oxygen-containing gas, which is supplied to the burners, to be reduced to between 28% and 30%.

In relation to the firing of the cupola furnace, three phases are therefore distinguished between in an embodiment of the invention:
- at T<800° C. low power supply and low oxygen content of 25% to 28% in the oxygen-containing gas supplied to the burners,
- at 800° C.<T<1350° C. the burners are run with a high proportion of oxygen of 32% to 37%, for example 35%, and
- at temperatures T>1350° C. the proportion of oxygen is reduced again to between 28% and 30%.

It has further proved advantageous for the combustion chamber to be provided with one or several lances. In this case, the burner or burners are preferably operated under sub-stoichiometric conditions and an oxygen-containing gas, preferably oxygen-enriched air or technically pure oxygen, is conducted into the combustion chamber via the lances. A staged combustion of the fuel is thereby achieved. Part of the fuel is firstly combusted under sub-stoichiometric conditions with the oxygen-containing gas conducted via the burner. The resulting mixture of reaction products and uncombusted fuel is then combusted with the oxygen-containing gas fed in through the lances.

This process has several advantages. Firstly, a spatially larger expansion and therefore more uniform heating of the cupola furnace are achieved. Secondly, lower flame temperatures arise than when the entire oxygen-containing gas needed for fuel combustion is fed straight to the burner. NOX emissions can thereby be effectively reduced.

This variant is advantageous, particularly in the melting phase, i.e. when molten material can be removed via the outlet or tap hole in the cupola furnace.

When using lances to conduct oxygen-containing gas into the cupola furnace, a maximum of 30%, preferably between 5% and 20%, of the total amount of oxygen-containing gas supplied to the cupola furnace is fed via the lances.

The lances are advantageously installed above the burners in the combustion chamber walls. The horizontal alignment of the lances may be tilted down slightly, just as with the burners; in other words, the central axes of the lances are tilted down towards the horizontal by an angle of between 5° and 15°, particularly preferably between 8° and 12°. The oxygen-containing gas emerging from the lances accordingly flows down towards the flames produced by the burners.

In order to even out combustion, the lances are also aligned in such a way that the projection of the central axis of a lance and the projection of the combustion chamber diameter running through the outlet of the lance create an angle of between 10° and 30°, preferably between 16° and 24°, on a horizontal plane. The projections of the centre axes of the lances do not therefore intersect the mid-perpendicular of the combustion chamber. The gas flows emerging from the lances are not directed right at the centre of the combustion chamber, but are slightly outwardly displaced, depending on the angle set, and all lances are preferably disposed at the same angle. However, the angle of inclination of the lances is preferably greater than the corresponding angle of inclination of the burners. For example, it has proved beneficial for the angle of inclination of the lances to be twice as great as that of the burners.

Depending on the speed at which the oxygen-containing gas flows from the lances, a rotational movement of hot combustion gases is caused in the combustion chamber, which involves a further evening-out of the energy supply. It has been shown that an outflow speed for the oxygen-containing gases from the lances of between 100 m/s and 200 m/s provides good results.

In order to minimise heat losses through the flue gas, the temperature of the flue gas leaving the cupola furnace is advantageously measured and the amount and oxygen content of the oxygen-containing gas is set, so that a flue gas temperature of between 80° C. and 250° C., preferably between 100° C. and 140° C., arises.

A thermocouple is fitted in the flue gas line, for example, and used to determine the flue gas temperature. Based on this measurement, the melting process is regulated in such a way that the transfer of heat to the base material being melted in the cupola furnace is optimised. The heat transfer mechanism, i.e. variation between convection and heat radiation, and the total energy supply to the cupola furnace is regulated in such a way that the flue gas temperature falls within the desired target range.

The invention and further details of the invention are explained in greater detail below based on the exemplary embodiments depicted in the drawings. In the figures, FIG. 1 shows a shaft furnace for implementing the method according to the invention, and FIG. 2 shows the burner configuration according to the invention.

Figure 2:
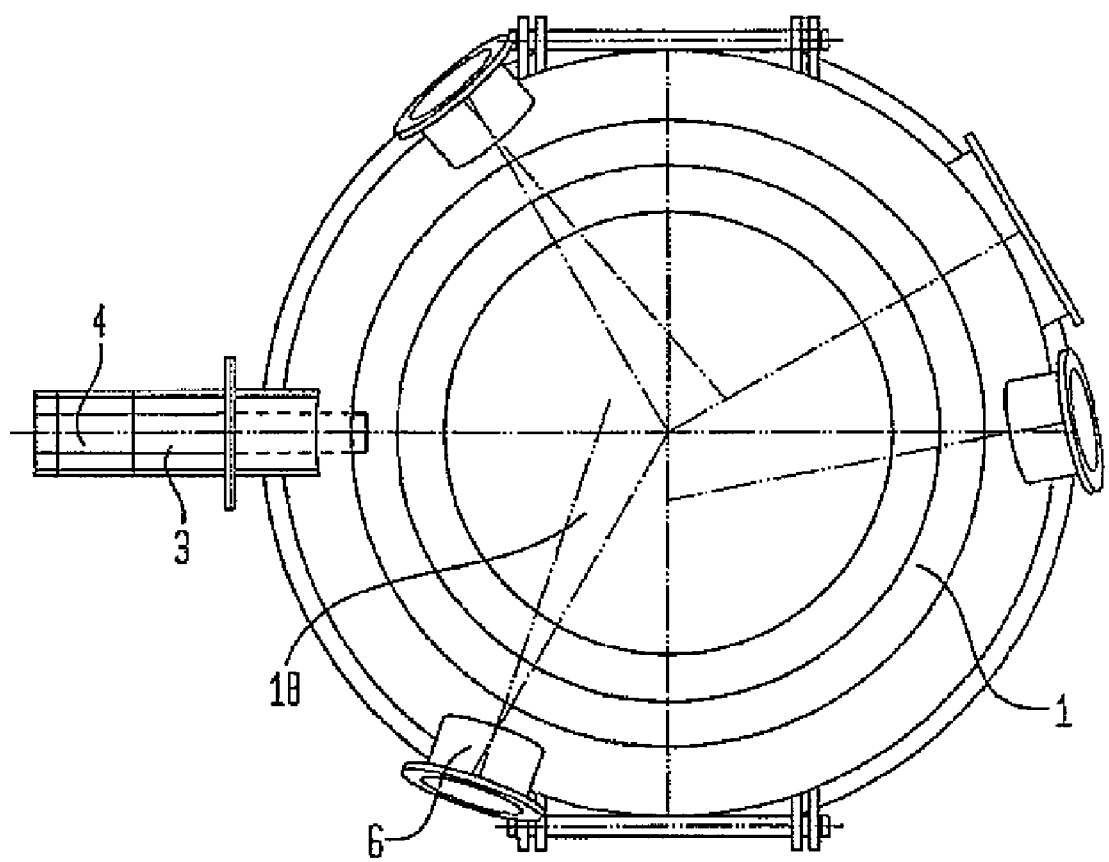

FIG. 1 shows a cupola furnace, which is designed for melting base material for mineral wool production. The cupola furnace has a cylindrical jacket 15, which encloses a shaft 11. Beneath the shaft 11 is located a combustion chamber 2. The combustion chamber 2 has a circular cross-section and extends down in conical form; in other words, the combustion chamber 2 is essentially a truncated cone. Reference number 1 denotes a hinged furnace floor.

The filler opening 12 into which the air outlet duct 14 discharges is illustrated in the inlet area of the shaft 11 in FIG. 1. The process heat removed via the air outlet duct 14 is conveyed via the heat exchanger 13 to a further use. The mounts 17 are used for the mechanical attachment of the cupola furnace.

Instead of or in addition to a batch-by-batch supply of base material to the cupola furnace, a conveyor unit 19 may also be provided, so that the base material is continuously fed into the furnace. Particularly in this case, but also in the case of batch charging, it is advantageous for the filler opening 12 in the shaft 11 to be closed with a lid 20.

In the area connecting the shaft 11 and the combustion chamber 2, a grate 7 installed at an angle can be seen in FIG. 1, from which the melt drops into the combustion chamber 2 during operation. In the floor area of the combustion chamber 2 there is a siphon 3 with a removal opening 4. The combustion chamber 2 has a floor that is tilted at an angle of between 0° and 5°, preferably between 2° and 5°, so that the resulting melt runs toward the siphon 3.

The combustion chamber 2 is fitted with three gas burners 6. The gas burners 6 are in the shape of external-mixing burners with separate gas supplies for a combustion gas, air and oxygen. The combustion gas, air and oxygen are only brought together outside the burner head, i.e. in the combustion chamber 2. The combustion gas outlet is advantageously located upstream of the air and oxygen outlets. This configuration makes it possible for the air and the oxygen to be mixed and vortexed together first, before coming into contact with the combustion gas. The vortexed mixture of air and oxygen then combines more effectively with the combustion gas and more stable combustion is achieved.

The gas burners 6 are disposed at an angle of 3 to 20° to the horizontal in the side walls of the combustion chamber 2, so that the outlet direction of the gases from the gas burners 6 is downwards at an angle. In addition, the longitudinal axes of the burners 6 are not directed straight at the vertical symmetrical axis of the combustion chamber 2, but deviate by an angle 18 of 4 to 15° from it (FIG. 2). In this way, a rotational flow is produced in the combustion chamber 2, which leads to a more stable combustion and uniform heating.

Above the gas burners 6, several lances 22 are fitted in the combustion chamber 2. The lances 22 are evenly distributed across the periphery of the combustion chamber 2 and tilted down at an angle of 5°, for example. As in the case of the gas burners 6, the lances 22 are not directed at the central axis of the combustion chamber 2. The alignment of the lances 22 deviates from the perpendiculars on the combustion chamber wall by an angle of 10° to 30°. This angle is preferably twice as large as the corresponding angle of inclination of the gas burners 6. In the top view, the lances 22 are preferably disposed in the gaps between the gas burners 6, although the gas burners 6 and lances 22 are not on a level.

Pure oxygen may be injected into the combustion chamber 2 at a speed of 100 m/s to 200 m/s via the lances 22. The angled installation of the lances 22 and the high flow speed of the oxygen causes a rotation of the atmosphere in the combustion chamber 2, which results in an evening-out of the heat input.

The combustion gas, natural gas for example, is preferably combusted in stages. Combustion gas and oxygen-enriched air are supplied via the gas burners 6 under sub-stoichiometric conditions and a reaction is induced between them. The resulting gas mixture is then combusted with the oxygen injected in via the lances 22. In this way, a flame with a large spatial extension and relatively low temperature is produced, so that the NOX emissions are minimised.

A thermocouple 21 is provided in the flue gas duct 14 for temperature measurement. The flue gas temperature should ideally be kept within a temperature range between 100° C. and 140° C. To achieve this, the combustion gas and oxygen or air supply to the gas burners 6 and the oxygen supply to the lances 22 is regulated depending on the flue gas temperature. By varying the combustion gas or air and/or oxygen supply, both the total heat output supplied to the cupola furnace and the main heat transfer mechanism can be influenced and made independent of one another. By increasing the amount of air supplied and with a corresponding reduction in the amount of oxygen supplied via the lances 22, the heat transfer can be increased by convection and reduced by radiation, for example, while the heat output remains the same. In addition, it is possible to use other parameters, such as the flue gas composition, flame intensity, flame size, temperature of the material being melted or the melt, etc. in order to control the melting process in the cupola furnace.

The invention claimed is:

1. A method for producing mineral wool from a mineral base material in a cupola furnace, wherein the cupola furnace includes a shaft to hold the mineral base material, the lower section of said shaft provided with a grate; a combustion chamber disposed beneath said grate and provided with an outlet for removal of the mineral base material as a molten base material; at least one burner for heating the combustion chamber, the at least one burner being supplied with a fuel having a first oxygen-containing gas, the method comprising:
providing the combustion chamber with at least one lance;
operating the at least one burner under sub-stoichiometric conditions;
conducting a second oxygen-containing gas into the combustion chamber through the at least one lance;
regulating a quantity and an oxygen content of the first oxygen-containing gas according to at least one parameter of a melting process for the mineral base material, the at least one parameter selected from the group consisting of flue gas temperature, flue gas composition, temperature of the mineral base material being melted, temperature of the molten base material that has been melted, and flame intensity;
wherein a central axis of the at least one lance and of a combustion chamber diameter extending through an outlet of the at least one lance produces an angle of between 10° and 30° on a horizontal plane.

2. The method according to claim 1, further comprising supplying the first oxygen-containing gas to the cupola furnace during the heating and when none of the molten base material is being removed through the outlet, the first oxygen-containing gas having a proportion of oxygen less than the first oxygen-containing gas supplied to the cupola furnace during melting when the molten base material can be removed through the outlet.

3. The method according to claim 1, further comprising supplying the first oxygen-containing gas to the at least one burner during the heating, the first oxygen-containing gas having a proportion of oxygen less than the first oxygen-containing gas supplied to the at least one burner during melting.

4. The method according to claim 2, further comprising operating the at least one burner during the heating with the first oxygen-containing gas having an oxygen proportion less than 30%, and operating the at least one burner during the melting with the first oxygen-containing gas having an oxygen proportion greater than 30%.

5. The method according to claim 1, further comprising operating the at least one burner such that a length of flames emerging from the at least one burner during combustion of the fuel with the first oxygen-containing gas is between 60% and 100% of a diameter of the combustion chamber.

6. The method according to claim 1, wherein the fuel supplied is selected from the group consisting of fuel that is coke-free, and fuel having a proportion of coke in the fuel being less than 20% of said fuel.

7. The method according to claim 1, wherein the fuel supplied is selected from the group consisting of oil and natural gas.

8. The method according to claim 1, wherein the heating comprises heating the combustion chamber with at least two burners disposed in side walls of the combustion chamber.

9. The method according to claim 1, further comprising inclining flames of the at least one burner at an angle of between 5° and 15° relative to the horizontal.

10. The method according to claim 1, wherein a central axis of the at least one burner and the combustion chamber diameter extending through a burner outlet produce an angle of between 3° and 20° on a horizontal plane.

11. The method according to claim 1, further comprising supplying less than 30% of a total amount of the second oxygen-containing gas to the combustion chamber through the at least one lance.

12. The method according to claim 1, wherein the second oxygen-containing gas flows from the at least one lance at a speed of between 100 m/s and 200 m/s.

13. The method according to claim 1, further comprising measuring a temperature of flue gas leaving the cupola furnace, and setting the quantity and the oxygen content of the first oxygen-containing gas such that a temperature of the flue gas rises to between 80° C. and 250° C.

* * * * *

UNITED STATES PATENT AND TRADEMARK OFFICE
CERTIFICATE OF CORRECTION

PATENT NO. : 8,127,574 B2
APPLICATION NO. : 12/484262
DATED : March 6, 2012
INVENTOR(S) : Thomas Niehoff et al.

It is certified that error appears in the above-identified patent and that said Letters Patent is hereby corrected as shown below:

Page 1 cover page, the designation "(73) Assignee:" should also include:
--, Grenzebach BSH GmbH (DE) and Odenwald Faserplattenwerk GmbH (DE)--

Signed and Sealed this
Second Day of April, 2013

Teresa Stanek Rea
*Acting Director of the United States Patent and Trademark Office*